United States Patent
Cornwell et al.

[15] 3,669,418
[45] June 13, 1972

[54] METHOD OF SPRAYING CONCRETE

[72] Inventors: Charles E. Cornwell; James H. Backus, both of Alexandria, Va.

[73] Assignee: Jennings Bailey, Jr., Frederick, Md.

[22] Filed: July 14, 1969

[21] Appl. No.: 841,298

[52] U.S. Cl............................................259/147, 259/152
[51] Int. Cl..........................................................B28c 5/06
[58] Field of Search.................259/145, 146, 147, 148, 149, 259/151, 153, 154, 4, 18

[56] References Cited

UNITED STATES PATENTS

| | | | |
|---|---|---|---|
| 998,762 | 7/1911 | Faller | 259/151 |
| 2,394,561 | 2/1946 | Parkhurst | 259/151 |
| 2,758,945 | 8/1956 | Widmayer | 259/147 X |
| 3,026,094 | 3/1962 | True | 259/147 |

*Primary Examiner*—Robert W. Jenkins
*Attorney*—Jennings Bailey, Jr.

[57] ABSTRACT

A method of producing concrete includes admixing with dry cement the amount of water for producing complete setting, thoroughly beating the cement and water, and adding substantially dry sand or aggregate. The water-cement mixture is usually too stiff to be workable, but is reduced by the beating action to a less viscous product, capable when aggregate is added thereto of being blown into a reinforcing material such as a wire screen and of penetrating through the screen into contact with a backing. The amount of water is preferably of the order 35 – 37 lbs. per 100 lbs. of cement. The equipment for carrying out the spraying may be such that compressed air alone is used to provide the power for stirring and to transport the material.

4 Claims, 8 Drawing Figures

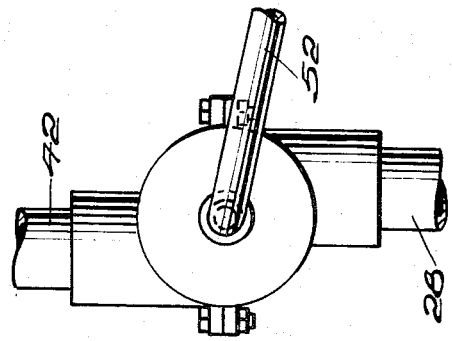
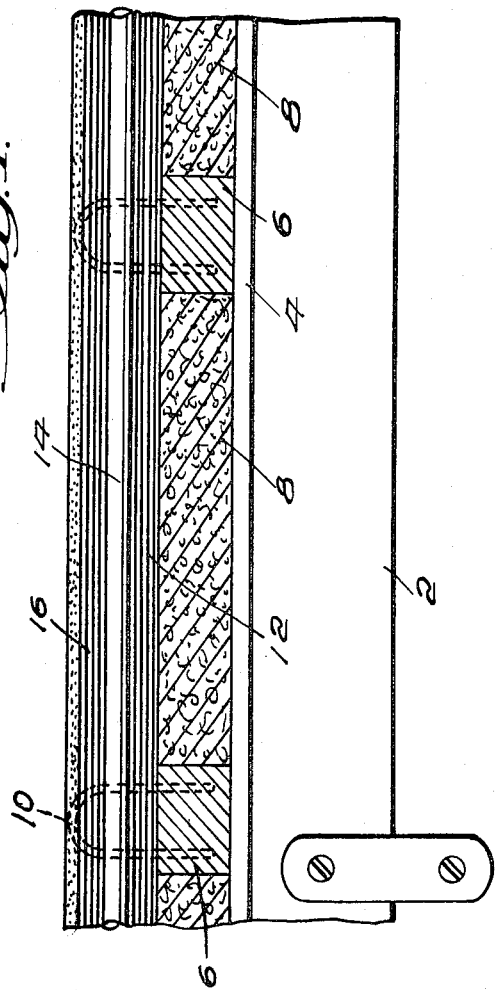
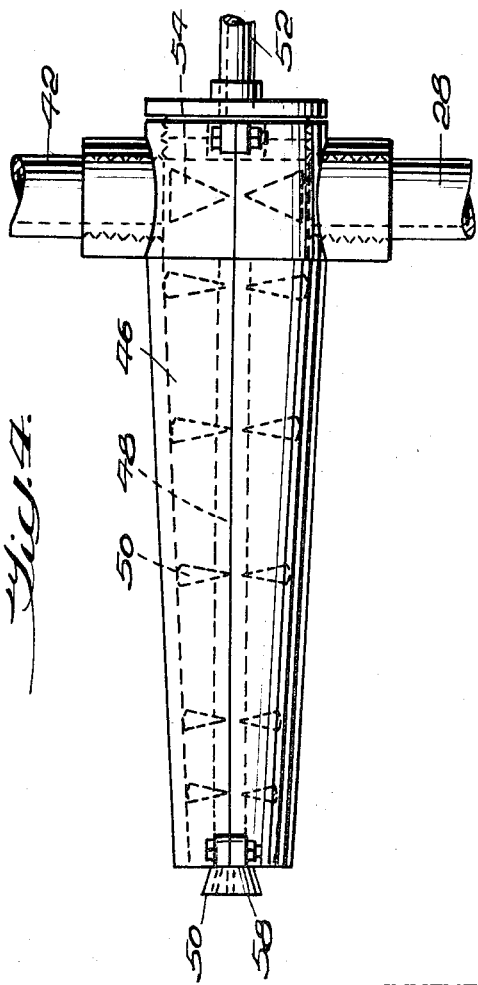
INVENTORS
CHARLES E. CORNWELL,
JAMES H. BACKUS,
BY Jennings Bailey Jr.
ATTORNEY

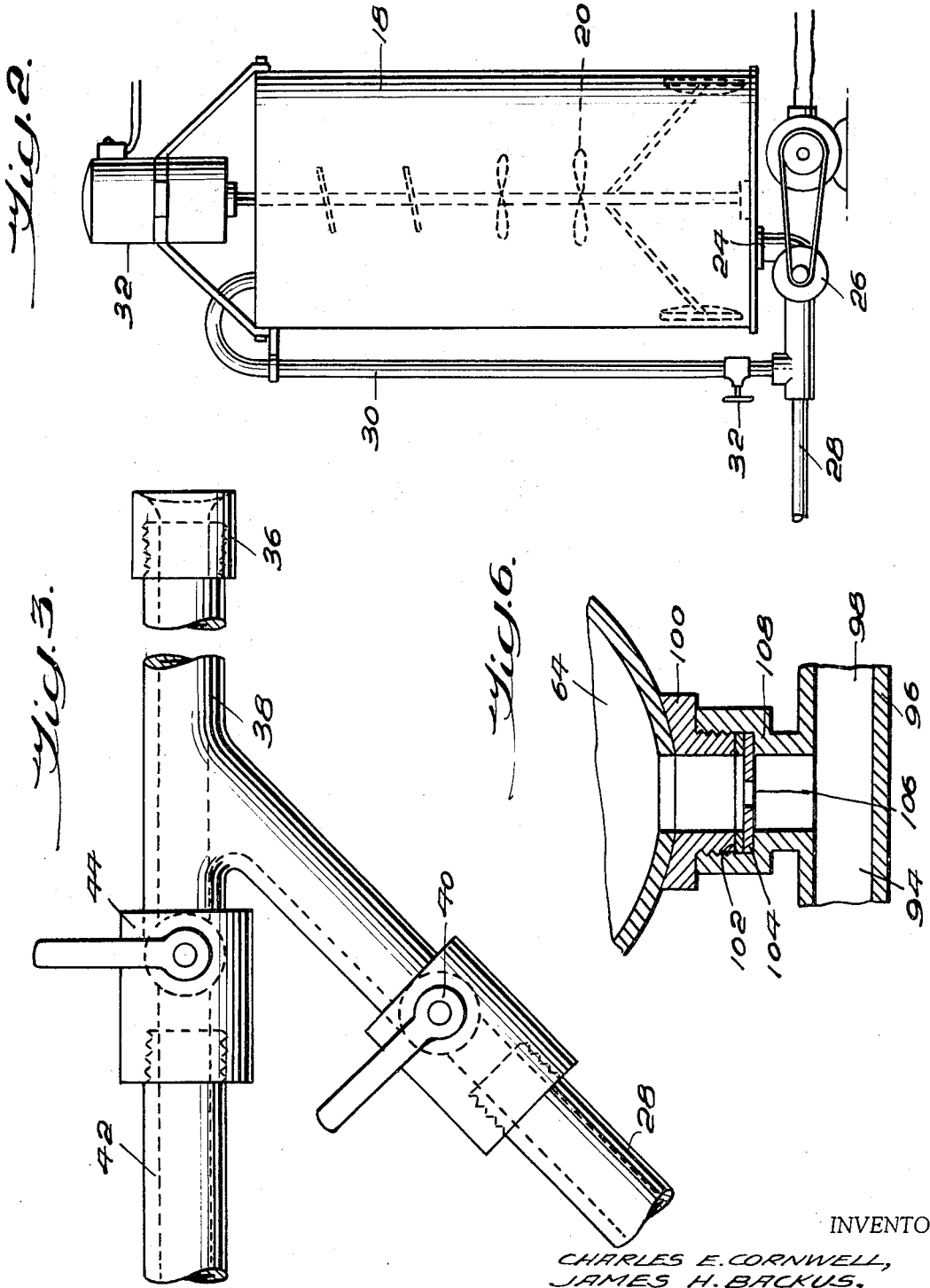

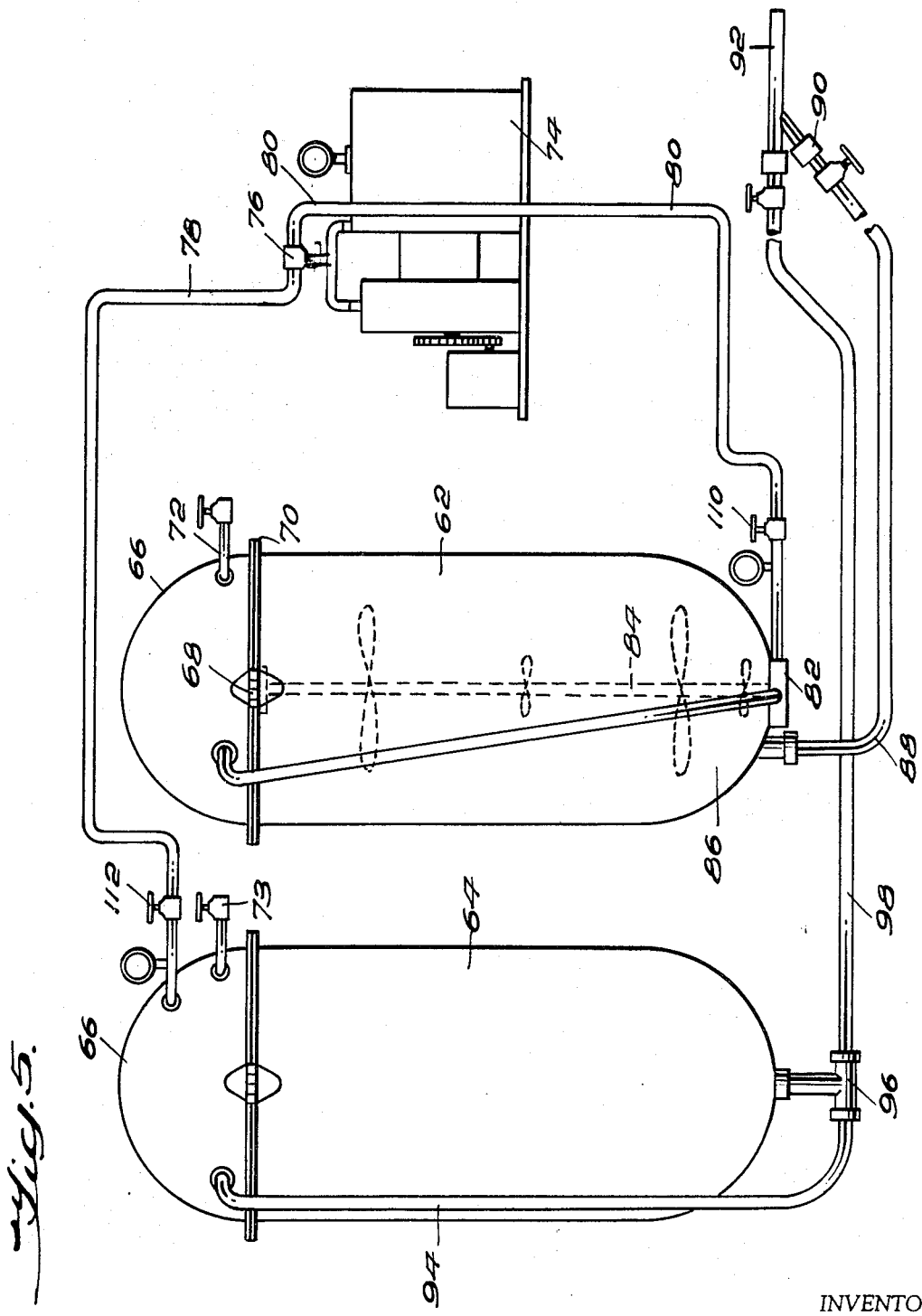

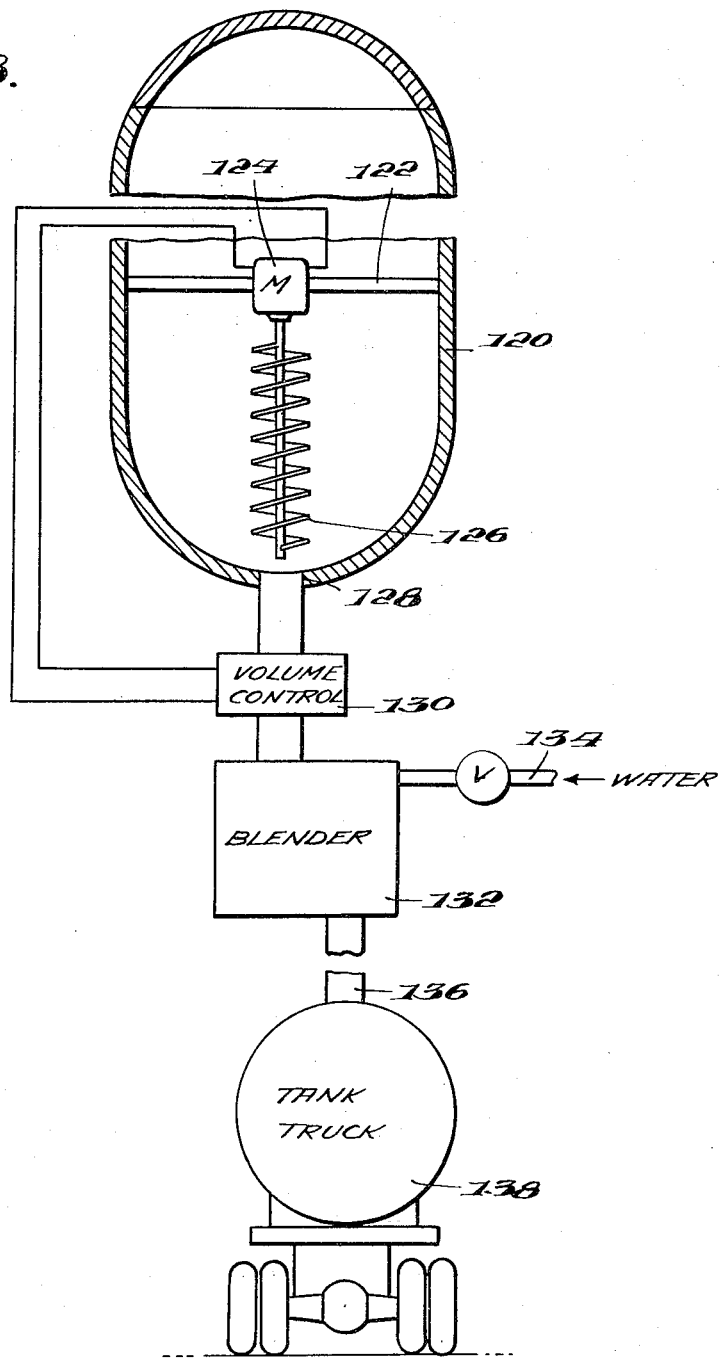

3,669,418

METHOD OF SPRAYING CONCRETE

BACKGROUND OF THE INVENTION

1. Field of the Invention

The invention relates to a method of producing concrete, as well as to a method of spraying concrete so produced and a nozzle for use in the spraying process.

2. The Prior Art

It has been known in the past to spray a slurry of concrete containing water, cement and sand or aggregate. Such procedures have not been particularly satisfactory because of the difficulties involved in obtaining proper uniform consistency capable of being projected through a spray nozzle. Most cements when admixed with water at the rate of 35 – 37 lbs. of water per 100 lbs. of cement produce a substantially unworkable mixture, incapable of being sprayed or otherwise worked to a desired final form. The addition of more water to make the product workable results in a decrease in the final strength after the cement is set.

When water, cement and aggregate such as sand are admixed in quantities necessary to produce a workable product, because of the absorption of some of the water by the sand, extra water is required in order to provide the amount necessary for reaction with the cement during setting. This extra water results in reduced strength in the final set product.

It has been found that the use of a flurry of the type according to the invention causes totally impermissible wear on ordinary pumps, because of the abrasive nature of the slurry.

SUMMARY OF THE INVENTION of a

Applicants have found that it is possible to produce a concrete which when set has substantially greater strength than normal concrete, without the requirement of expensive additives, by mixing together cement and just enough water to set the cement, this being in most cases an amount of the order of 35–37 lbs. of water per 100 lbs. of cement, and then subjecting the normally unworkable mixture to violent beating in a blender, which results in producing a much less viscous and more workable slurry of water and cement. This slurry is then admixed with dry sand, preferably by blowing the slurry and the sand at moderate pressures and speeds through a nozzle, upon a surface which may have reinforcing material thereon such as wire mesh or expanded metal. It has been found that the resulting concrete will penetrate the mesh of the wire and will when set have substantially greater strength than normal concrete, even of the type which is not sprayed.

It is also contemplated that, for purposes of placing concrete in moulds, the cement and water will be first thoroughly admixed and then charged into an ordinary concrete mixer with dry sand and mixed therewith while being transported to the job.

A further important feature of the invention is the provision of an apparatus for forming the mixture of slurry and sand, and spraying it on a surface to be coated, which is operable entirely by air pressure and which does not rely on ordinary pumps for propelling the sand and slurry. This apparatus is extremely simple in construction, but is effective in producing the mixture of sand in the slurry and spraying it on the surface to be coated by means of air pressure alone, avoiding the abrasive action on pumps which makes the life of other spraying devices impractically short.

BRIEF DESCRIPTION OF THE DRAWINGS

In the drawings:

FIG. 1 shows in side elevation, partly in section, a wall or other rigid product produced according to the invention;

FIG. 2 shows an arrangement for mixing and pumping the cement and water;

FIGS. 3 and 4 show two forms of spray nozzles;

FIG. 5 shows a modified form of apparatus for carrying out the invention;

FIG. 6 shows a detail of FIG. 5;

FIG. 7 is an end view of FIG. 4;

FIG. 8 shows another form of apparatus.

DESCRIPTION OF THE PREFERRED EMBODIMENTS

FIG. 1 shows in cross-section a part of a structure in the production of which the present invention is used. This may be for example the hull of a boat. It includes ribs such as 2 for a bulk head and attachments, to which is attached a sheet 4 of plywood, plaster board or the like. To this sheet are attached second ribs 6, between which are plates 8 of foamed styrene or the like. To these ribs are secured by staples 10 a number of layers 12 of wire mesh, for example ordinary 1-inch chicken wire, or expanded metal or both. Above these are secured wire rods 14, and on top of these further layers 16 of wire mesh. According to a particular feature of the invention, a cement slurry is sprayed on this reinforcement structure. A particular feature of the invention is that the slurry is such that it can penetrate through the wire and the expanded metal and adhere tightly to it and the foamed inserts, while at the same time its strength is very substantially greater than that of a normally sprayed concrete slurry. The chicken wire used is ungalvanized for better adhesion.

According to the invention a mixture of cement and water, preferably in the proportion of 35 – 37 lbs. of water to 100 lbs. of cement, is introduced into a drum such as that shown in FIG. 2 at 18. This drum contains beaters 20 driven by a motor 22 which stir the water and cement. The mixture leaves the tank through a pipe 24, being drawn by a pump 26 which feeds it through a pipe 28 to the spray gun described below. A recirculating pipe 30 contains a check valve 32 which is fed so as to open at a pre-determined pressure, for example 50 PSI, so that the pressure of the material in the pipe 28 is controlled at this value.

The pipe 28 is connected to a nozzle which may be of the type shown in FIG. 3. This nozzle includes a spray tip 36 connected to a pipe 38 with which the pipe 28 is connected, with a valve 40 by which it may be closed.

The proper amount of sand, for example 150 to 200 lbs. per each 100 lbs. of cement, is fed from a conventional type of sand tank from which it is removed by compressed air at a pressure of substantially the same pressure as that which exists in pipe 28 and is fed to pipe 42 connected to pipe 38 through manually operated valve 44.

Such a nozzle will put out about 12 lbs. per minute of water-cement slurry, with 14 lbs. of sand per minute (volume weight).

The slurry formed in the tank 18 is very difficult to handle, because of its high viscosity, but, if it is sufficiently agitated and stirred by the pump 26, its viscosity will be substantially reduced. In fact, the viscosity is sufficiently reduced so that it can be pumped through the spray gun and will penetrate a number of layers of wire or expanded metal. The sand, being added only just before it is sprayed from the gun, does not need to be wet, and therefore does not require additional water which would reduce the strength of the set concrete and impair its setting properties. On the other hand, the sprayed concrete according to the invention does not set appreciably faster than a normally sprayed concrete mix.

The material may be sprayed not only on a level surface but also on a vertical or downwardly sloping surface. The procedure requires comparatively little air, of the order of 40–100 cubic feet per minute for 26 lbs. of the concrete mix.

The resulting concrete when set is substantially stronger than normal concrete mixes, and is free of bubbles and other flaws.

FIG. 4 shows another form of nozzle. In this the pipes 28 and 42 meet opposite each other opening into the nozzle 46 at right angles to its longitudinal axis. The nozzle 46 encloses a shaft 48 carrying vanes 50. An additional air current is introduced through pipe 52, which through an air motor 54 drives the shaft 48. The shaft 48 is hollow, and its interior is connected to the air pipe 52 beyond the air motor 54. The pipe extends slightly beyond the free end of the nozzle, as at 56, and has lateral openings 58 through which the air escapes. The air jets thus produced tend to spread out the mixture of sand and water — cement being expelled from the nozzle so as to distribute it more evenly over the area sprayed. The vanes 50 and the inner lining of the nozzle are preferably of rubber.

FIGS. 5–6 show a spraying apparatus which is operated by air pressure alone, so that it can be worked by an air compresser mounted on a truck or other carrying vehicle, without the need for any electrical motor.

In this form of the invention, tank or blender 62 is used for containing cement and water and tank 64 for sand. These tanks are covered by lids 66 which may be hinged at 68 and provided with sealing clamps 70 to hold them tight. In the lid of each tank is a manually operable valve 72, 73.

The air compresser 74 supplies air under pressure through a T-connection 76 to pipes 78 and 80. Pipe 80 is connected to an air motor 82 at the bottom of tank 62, which drives a bladed agitating shaft 84 within the tank. This air motor may be a simple shaft with extending curved vanes which are impinged by the air from the pipe 80 entering tangentially into the motor 82. The outlet of the motor casing 82 is connected by a pipe 86 to the interior of the lid 66 of the tank 62. In the bottom of the tank 62 is an outlet connected to a pipe 88, which in turn leads into an interchangeable washer-holding control member 90 and to a spray gun 92. This gun may be for instance either of the type shown in FIGS. 3 and 4.

The There 78 leads to the top 66 of tank 64. There is also a connecting pipe 94 leading from the interior of the lid 66 of tank 64 to a T-arrangement 96 as shown in more detail in FIG. 6. The other branch of this T connects with a pipe 98 which leads to the spray gun 92.

The T-arrangement shown in FIG. 6 includes a nipple 100 welded to the bottom of the tank 64 against the end of which rests a gasket 102 and a metal washer 104 having an opening 106 therethrough, the gasket and washer being clamped by a shoulder 108 on the T 96 against the end of the nipple 100. This arrangement makes it easy to interchange the washer 104 to adjust the flow of sand. In a device here shown, and operating with a pressure of 50 PSI, an opening of ¼ inch has been found to give proper flow of sand.

In the use of this device, the valves 72 and 110 are opened while valve 112 is closed. The compresser then supplies compressed air through pipe 80 to air motor 82, and by rotating the shaft 84 and agitating the cement-water mixture of the proper proportions forms a slurry. If however, it is desired to use the device more frequently without waiting to produce the slurry in the tank 62, the slurry can be made up into another tank and simply dumped into the tank 62. Assuming the tank is filled with slurry of a gel-like consistency of the type which characterizes the invention, the valve 72 is closed (valve 73 already being closed) and valve 112 is opened. The result is that pressure builds up in the covers 66 of the tanks. Pressure in the tank 62 forces the cement-water slurry into the pipe 88 and through the orifice 90 to the spray gun 92. Because the air enters tank 66 only slowly, when it has once built up pressure therein, to replace the slurry which is being sprayed from the tank, the air motor will be rotated only slowly, but enough to maintain the slurry in its proper condition. At the same time, the pressure in the top of tank 64 will be exerted on the top of the sand and will force it down through the T 96 into the line 98. At the same time, the air will pass through line 94 to the T 96 and will there pick up the sand and convey it through the line 98 to the spray gun 92. This continues until the tanks are empty, where upon they are recharged and the procedure described above is repeated.

Of course the pressure provided by compresser 74 is sufficiently great as compared with the size of pipe 94 so as to build up a substantial pressure in the lid 66 of tank 64 and thereby to produce the discharge of the sand from the bottom of the tank.

The rate of sand discharge can be adjusted by varying the pressure of the compresser, or by interchanging the washers at 90 and 104.

The tanks in the apparatus shown have a capacity of approximately 50 gallons each. Using air at 50 lbs. pressure, they will spray approximately 25 lbs. of cement-water and sand mix per minute, thus operating for approximately 50 minutes before refilling if necessary.

While we have described the use of sand as an additive, other solid particulate aggregate material such as gravel may be used.

The device shown in FIG. 8 includes a tank 120 with a removable top for receiving dry cement. Mounted by a spider 122 within the tank is a motor 124 which drives an auger 126 for feeding the material through the wall opening 128. From there it passes through a volume control device 30 which is connected to the motor to cause the motor to operate at such a speed as to deliver a predetermined amount of cement per unit of time. The cement then passes through a blender 132 which also receives water through a pipe 134. The outlet pipe 136 of the blender is adapted to deliver the blended mixture to a tank truck 138.

The blender may be of the type known as a shear-flow blender, with recirculation, of the type produced by Tensco, of Barrington, R. I., having a number of turbine-like blades.

In the use of this apparatus, the cement and water are blended in the blender, thus being beaten to a condition of lower viscosity and are fed into the tank truck. The truck is then moved to another position from which it receives dry sand or aggregate, which is then mixed by the rotation of the tank with the slurry previously formed.

What is claimed is:

1. In the placing of concrete, the steps of admixing cement with water in a quantity just substantially great enough to produce setting of the cement, thereby forming a relatively viscous material, beating said material vigorously until its viscosity is substantially reduced to form a slurry, and admixing substantially dry aggregate material with said slurry.

2. A process as claimed in claim 1, in which the proportion of water to cement is substantially 35–37 lbs. of water per 100 lbs. of cement.

3. A process as claimed in claim 1, in which said aggregate material and reduced-viscosity slurry are fed through a mixing nozzle, at least the aggregate material being propelled into and through said mixing nozzle by a carrying current of air under pressure.

4. A process as claimed in claim 3, in which the aggregate material-cement mixture from said nozzle is sprayed onto a backing surface with meshed reinforcing material secured with meshed reinforcing material secured on the face thereof on which the mixture is sprayed.

* * * * *